United States Patent [19]

Stiles

[11] 3,924,475
[45] Dec. 9, 1975

[54] VIBRATING RING GYRO
[75] Inventor: John C. Stiles, Morris Plains, N.J.
[73] Assignee: The Singer Company, Little Falls, N.J.
[22] Filed: Oct. 23, 1973
[21] Appl. No.: 408,314

[52] U.S. Cl............... 74/5.6 A; 73/517 AV; 73/505
[51] Int. Cl.² .......................................... G01C 19/28
[58] Field of Search....... 73/517 AV, 505; 74/5.6 A, 74/5.6 R, 5.7, 5 R; 308/10; 250/231 GY

[56] References Cited
UNITED STATES PATENTS

| | | | |
|---|---|---|---|
| 3,307,409 | 3/1967 | Newton, Jr. | 73/505 |
| 3,318,160 | 5/1967 | Erdley et al. | 74/5 R X |
| 3,367,194 | 2/1968 | Diamantides | 74/5.6 A |
| 3,394,597 | 7/1968 | Frohmberg et al. | 74/5.6 D |
| 3,408,872 | 11/1968 | Simmons et al. | 73/505 |
| 3,559,492 | 2/1971 | Erdley | 73/517 AV X |
| 3,625,067 | 12/1971 | Emslie | 73/505 |
| 3,656,354 | 4/1972 | Lynch | 73/505 |
| 3,680,391 | 8/1972 | Denis | 73/505 |
| 3,719,074 | 3/1973 | Lynch | 73/505 |
| 3,779,087 | 12/1973 | Dickie | 73/517 AV |

Primary Examiner—Charles J. Myhre
Assistant Examiner—William C. Anderson
Attorney, Agent, or Firm—T. W. Kennedy

[57] ABSTRACT

An extremely simple gyroscope for use in a strapdown system having a vibrating ring as the gyroscopic element. The ring is supported and vibrated by an electrostatic field, established by a voltage supplied to case-fixed electrodes. An additional pair of fixed electrodes senses the position of the nodes of vibration of the ring and an eddy current drive forces rotation of the ring to move the nodes back to a reference position. Optical sensing means provide the pick-off, sensing the direction and amount of rotation required to move the ring back to the nodal reference position.

21 Claims, 7 Drawing Figures

VIBRATING RING GYRO

BACKGROUND OF THE INVENTION

This invention relates to gyroscopes and more particularly to gyroscopes where a vibrating ring is the inertial reference element. In more gyroscopes a gyro wheel is rotated at a high rate of speed to provide an angular momentum vector along the axis of the wheel. The wheel will maintain a constant direction in space, and thus can be used as an angular spatial reference, provided that the wheel can be supported and driven by means that have substantially zero friction and error torques. In practice this has proved to be very difficult to do the necessary accuracy, leading to expensive instruments with limited life and reliability. Furthermore, many of the techniques in current use, such as enclosing the wheel in a container which is then floated in a fluid of the same average density, limit the maximum angle between the wheel and its supports to some small value. This is impractical for a strapdown system in which unlimited angular inputs are required.

These problems may be avoided by using a vibrating ring in place of the rotating wheel. It can be mathematically proven that if a ring is set into vibration in the out-of-round mode and then rotated through some angle, the vibration pattern as indicated by the nodes will rotate exactly four-tenths of this angle. This effect may be used to measure the rotation of the vehicle by the following method: the ring is supported by means to be described below so that it is free to rotate about its axis of symmetry. It is set into oscillation and the position of the nodes is determined by a sensor attached to the vehicle. If the vehicle now rotates, the sensor will move away from the nodes. The ring is now forced to rotate so as to carry the nodes back to the sensor. The rotation of the ring necessary to accomplish this is a direct measure of the vehicle rotation and may be determined by sensing the angle between the ring and the vehicle. There are a number of problems associated with the support, rotation, and readout means which must be overcome to provide a practical embodiment.

One of these problems is to provide means for supporting the ring in a manner which will prevent unacceptable drift. Previously disclosed support means include thin-walled cylindrical or hemispherical shells upon which the ring is supported. A second means includes a plurality of support rods extending from a stationary base and connected to the ring by thin, necked-down portions which constitute a spring. A third means, utilized in the preferred embodiment of the present invention, involves the use of an electrostatic or electro-magnetic field to support the ring.

Another necessary feature of such constructions is the means for maintaining the ring in sustained vibration. Previously suggested means include a radial magnetic or electrostatic field exerting a force on the ring as a function of its displacement from the nominal circular condition. While this has the advantage of great symmetry, the actual power deliverable to the ring will be extremely small, requiring the use of very high magnetic or electrostatic fields. Another means, preferred for use in the present invention, employs an electrostatic force supplied from electrodes arranged in two or more pairs of diametrically opposed segments. The local velocity of the ring under each segment is measured and a voltage applied to the opposite electrode segment to produce a force in phase with the velocity. All the energy required may be provided without unduly high fields since the effect does not depend on field non-linearities.

The third problem associated with the use of vibrating rings as gyroscopic elements is the pick-off or sensing means. A previously suggested mode of operation for performing the sensing involves fixing the ring to the vehicle and measuring the angle between the instantaneous nodal position and the vehicle axis by means of a set of variable capacitance or variable inductance pick-offs. However, to be of use in a navigation system, the angular accuracy must be of the order of ten seconds of arc, and this accuracy must be maintained over the full 360° of rotation. This implies a pick-off accuracy and resolution of the order of 50 parts per million. Providing a pick-off means with this degree of accuracy approaches or exceeds the present state of the art. Thus, the use of pick-offs with this mode of operation has severely limited the prospects of constructing a practical vibrating ring gyroscope.

It is a principal object of the present invention to provide a gyroscope with a vibrating ring as the gyroscopic element having novel and improved pick-off means.

A further object is to provide a vibrating ring gyroscope in a strap-down application having acceptable accuracy while remaining relatively simple and compact.

Still another object is to provide a novel vibrating ring gyroscope employing an optical encoder to measure the ring's angular position.

In a more general sense, the object of the invention is to provide a novel and practical gyroscope of the vibrating ring type.

SUMMARY OF THE INVENTION

The invention is disclosed in an embodiment wherein the ring is supported by an electrostatic field, being free to rotate about its axis of symmetry. The electrode plates are fixed to the case of the instrument which is rigidly attached to the vehicle. A capacitor bridge circuit senses any positional change of the ring other than about its axis and applies appropriate voltages to the electrodes to maintain the ring in a centered position with respect thereto.

The ring is maintained in a state of sustained vibration, also by means of an electrostatic field, establishing nodes of vibration having a null position with respect to a pair of pick-off electrodes. An eddy current torquer applies a rotational force to the ring sufficient to move the nodes back to their null position in response to any rotation. This motion is a linear function of vehicular rotation about the ring axis.

The reading is provided by optical sensing means fixed with respect to the instrument case and an appropriate optical pattern on the ring. In the disclosed embodiment, a light source, beam splitter and photodetectors are positioned within the ring and two circumferential mirror patterns, each consisting of evenly spaced reflective and non-reflective portions, are provided on the inside surface of the ring. One of the photodetectors is arranged to receive light from one of the mirror patterns and the other photodetector from the other mirror pattern, the two being positionally related in terms of the location of reflective and non-reflective areas.

A simple logic circuit receives signals from the photodetectors and activates an up-down counter in response thereto. Thus, the value in the counter provides a direct measurement of the angular motion of the ring necessary to maintain the vehicle-fixed position of the nodal pattern.

DESCRIPTION OF THE PREFERRED EMBODIMENT

The present invention is predicated upon standing waves of vibration and corresponding nodes being set up along the circumferential extent of a thin-walled ring. It is well known that there is a fixed relationship between a rotation of the ring about its axis and an apparent rotation of the nodes with respect to the ring, whereby the ring is a gyroscopic element. The ring is vibrated electrostatically, or by any other suitable means.

Figure 1:
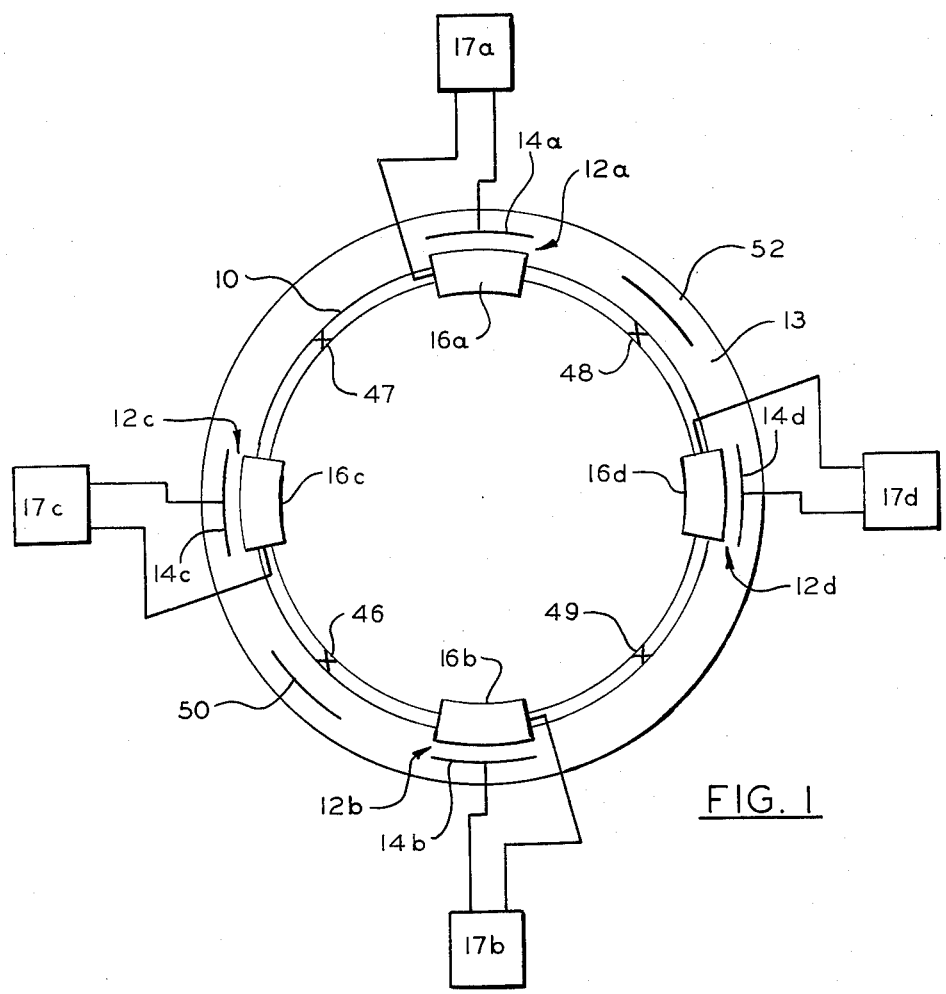
FIG. 1 is a diagrammatic, plan view of the ring and associated elements.

Referring now to FIG. 1, a thin-walled ring 10 is electrostatically supported between fixedly mounted, arcuate support electrodes which are symmetrically disposed close to the outside of the ring 10 along the circumferential extent thereof. In the disclosed embodiment, the support electrodes are provided in four segments, respectively designated by reference numerals 12a, 12b, 12c and 12d, each comprising a pair of plates fixedly mounted on the instrument case, diagrammatically indicated at 13. One plate of each pair is positioned adjacent one edge of the ring and one on the ring and one on the outside, with an annular plate of the same diameter as the ring, positioned adjacent the opposite edge and thus not seen in FIG. 1. The plates are diagrammatically shown in FIG. 1, those adjacent the edge of the ring being numbered 16a, 16b, 16c, 16d, and those on the outside of the ring 14a, 14b, 14c, 14d. Each pair of plates is connected as an element of capacitors in a bridge circuit, described later in more detail, such circuits being indicated in FIG. 1 by blocks 17a, 17b, 17c, 17d.

Figure 2:
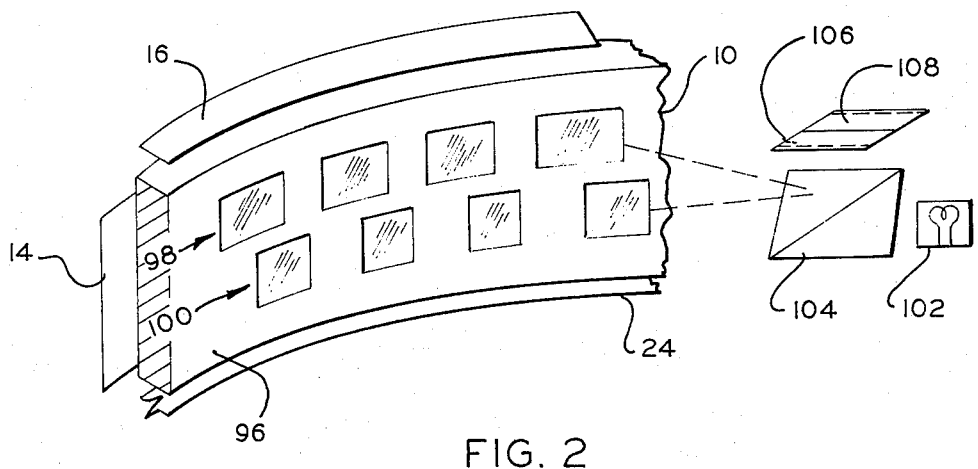
FIG. 2 is a fragmentary, diagrammatic, perspective view of a portion of the ring of FIG. 1, and associated elements.

In FIG. 2 are shown one pair of plates 14 and 16, which may be any one of the pairs shown in FIG. 1, together with a fragment of plate 24 and ring 10. It will be readily seen that each of the plates 14, 16, 24 may form one side of a capacitor, with ring 10 forming the other side of each capacitor. The capacitance of the respective capacitors will be a function of the air gap between the respective plates and the ring. Since each of the plates is fixed to the instrument case, the capacitance is a measure of ring position or movement in any direction other than rotation about its central axis. Thus, by properly regulating the electrostatic field, the ring may be maintained in a centered position with respect to the plates, being free to move only about its axis.

Figure 3:
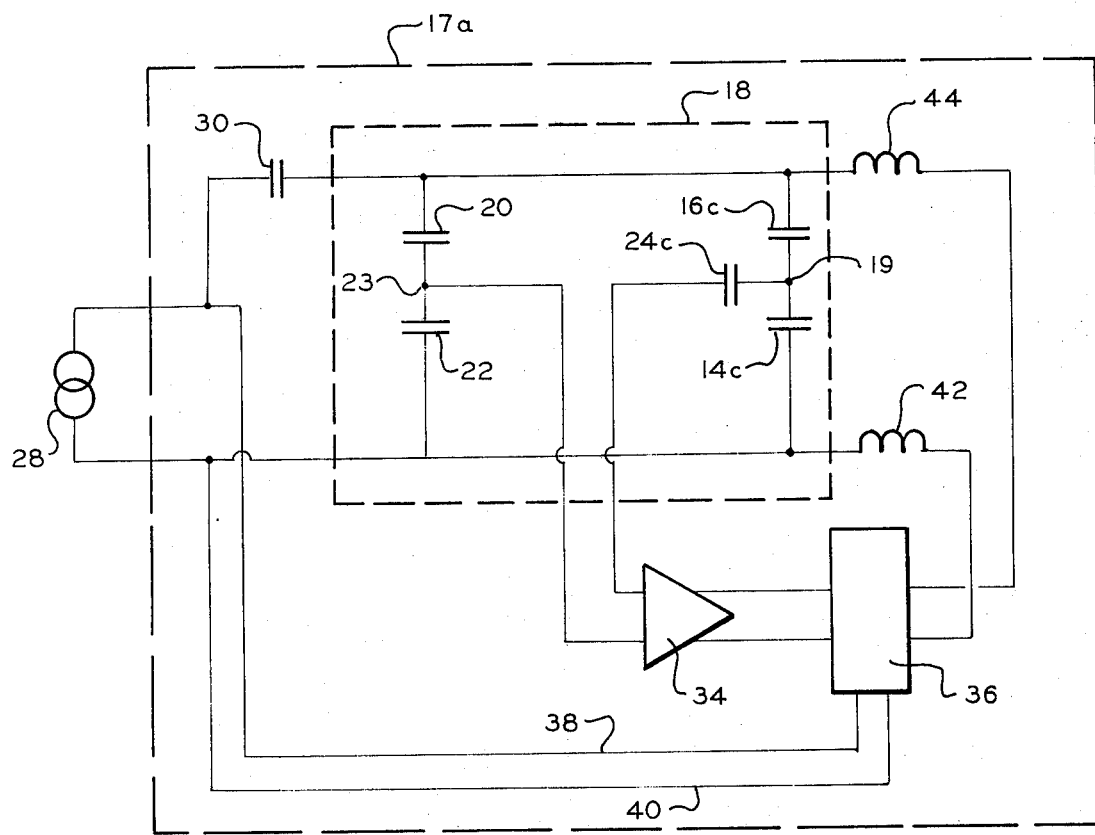
FIG. 3 is a schematic diagram of a positioning circuit for providing electrostatic support for the ring of FIG. 1.

Referring now to FIG. 3, the first DC support voltage is applied by a positioning circuit 17a which includes a capacitor bridge circuit 18. The bridge circuit 18 has a first leg which is comprised of a capacitor 16c formed by the plate 16 and the ring 10, and a capacitor 14c formed by the plate 14 and the ring 10. The ring 10 is common to the capacitors 14c, 16c, thereby forming a series connection at a junction 19. Accordingly, the junction 19 is a schematic representation of the ring 10.

Connected in parallel with the first leg is a second leg of the bridge circuit 18 which is comprised of capacitors 20, 22 which are connected at a junction 23 in series. It should be understood that the capacitors 20, 22 are selected to have respective capacities which are in a ratio equal to the desired ratio of the respective capacities of the capacitors 16c, 14c.

According to one aspect of the present invention, a pick off from the ring 10 is provided by fixedly mounted annular electrode 24 (FIG. 2) which has substantially the same diameter as the ring 10. The electrode 24 is disposed adjacent and parallel to an edge of the ring 10. In the bridge circuit 18 (FIG. 3) a pick off capacitor 24c is formed by the electrode 24 and the ring 10.

Excitation to the bridge circuit 18 is provided by an AC voltage source 28 which has one side connected to the capacitors 20, 16c via capacitor 30. The capacitor 30 provides a high impedance path to the first DC support voltage which is applied to the capacitors 14c, 16c as described hereinafter. The other side of the source 28 is connected to the capacitors 22, 14c.

As is well known in the art, when the ring 10 is in a support position to cause the desired ratio of capacities referred to hereinbefore, the bridge circuit 18 is balanced, whereby zero volts is provided between the junctions 19, 23. In response to the ring 10 being displaced from the support position to cause a ratio greater than the desired ratio, an AC voltage of a known phase is provided between the junctions 19, 23. In response to the ring 10 being displaced to cause a ratio less than the desired ratio, an AC voltage, of a phase opposite from the known phase is provided between the junctions 19, 23.

The junction 19 is connected through the capacitor 24c to an amplifier 34 at a first input thereof, a second input of the amplifier 34 being connected to the junction 23. The amplifier 34 amplifies the voltage applied to the inputs thereof, thereby providing an amplified AC voltage.

The output of the amplifier 34 is connected to a synchronous demodulator 36 at a signal input thereof. Additionally connected to the demodulator 36 at a reference input thereof is the source 28 through lines 38, 40. The demodulator 36 provides the first DC support voltage in proportion to the amplified AC voltage. In response to the amplified AC voltage being of the known phase, the first DC support voltage is of a positive polarity. Conversely, the first DC support voltage is of a negative polarity in response to the amplified AC voltage being of the opposite phase. The demodulator 36 may be a well known diode ring demodulator, or any other suitable demodulator.

The output of the demodulator 36 is provided to the capacitors 14c, 16c through inductors 42, 44, respectively, whereby the first DC support voltage is provided to support the ring 10. The inductors 42, 44 provide a high impedance to the AC voltage from the demodulator 36, thereby isolating the source 28 from the output of the demodulator 36.

In the preferred embodiment, the first DC support voltage having the positive polarity causes a positive electrostatic force whereby the ring 10 is attracted to the electrode 16 and repelled from the electrode 14. Conversely, the negative polarity causes a negative electrostatic force, whereby the ring 10 is repelled by the electrode 16 and attracted to the electrode 14. It should be understood that the first DC support voltage is applied in a sense to support the ring 10 in the support position. Symmetrically disposed with respect to the pair of electrodes 12a are the electrodes 12b, 12c, 12d connected to positioning circuits 17b, 17c, 17d (FIG. 1), similar to the positioning circuit 17a, for providing attraction and repulsion as described hereinbefore. The capacitor 24c is common to all positioning circuits.

In the preferred embodiment, the source 28 provides the AC voltage at a frequency which causes the ring 10 to be in an alternating electrostatic field, whereby an alternating electrostatic force vibrates the ring 10 causing nodes of vibration at node locations 46, 47, 48, 49 (FIG. 1) of the ring 10. Positioned outside of the ring 10 and close to the node locations 46, 48 are fixedly mounted arcuate capacitor plates 50, 52, respectively. In response to apparent rotation with respect to the plates 50, 52 of the node locations 46, 58, the ring 10 is rotated to cause the node location 46, 48 to maintain a substantially fixed position with respect to the plates 50, 52. The amount of rotation of the ring 10 has a known relationship to the rotation in space of the plates 50, 52 about the axis of the ring 10.

Figure 4:
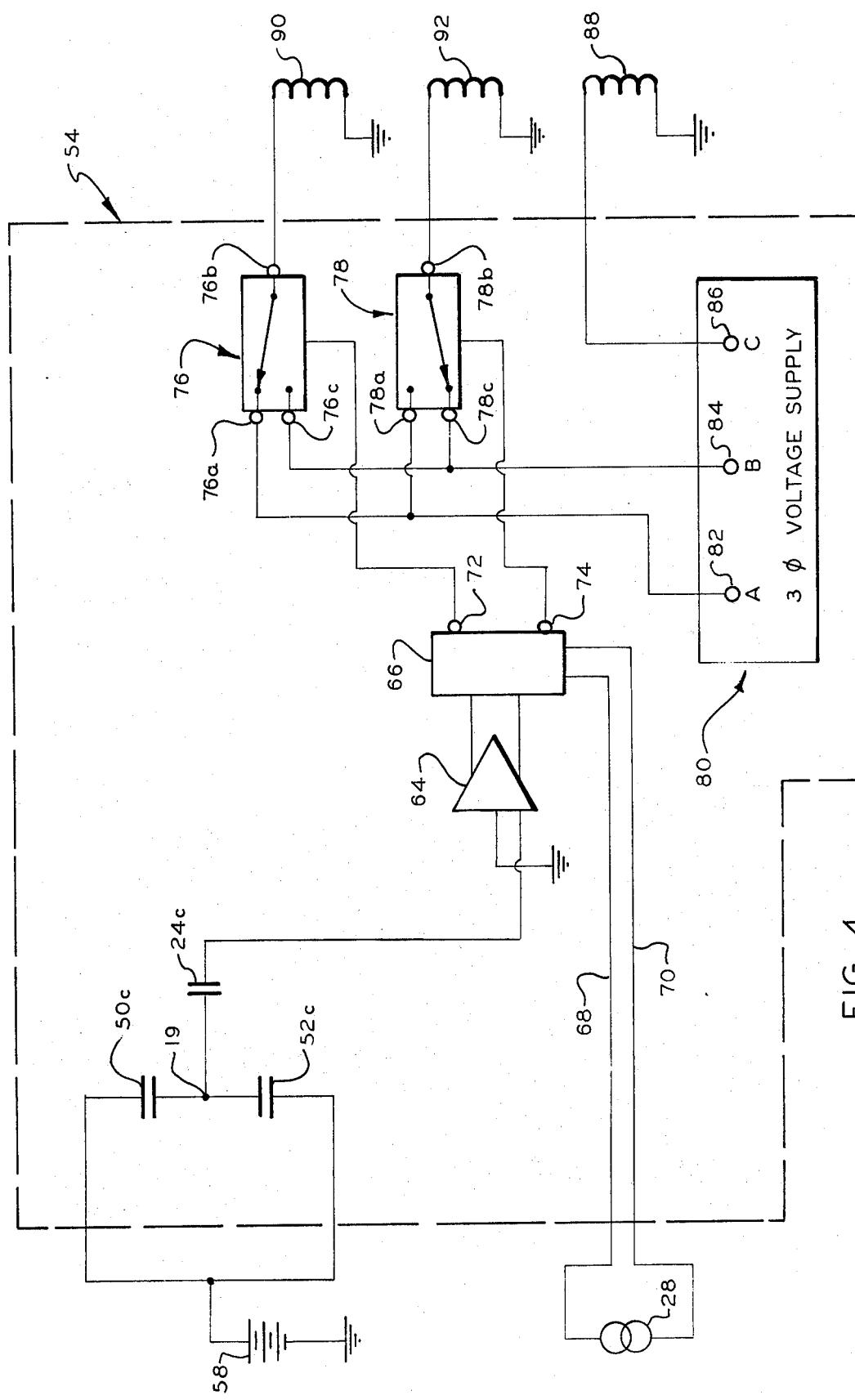
FIG. 4 is a schematic diagram of a rotation circuit for rotating the ring of FIG. 1.

Referring now to FIG. 4, a rotation circuit 54 includes a voltage pick-off circuit 56. The pick-off circuit 56 is comprised of a capacitor 50c formed by the plate 50 and the ring 10 and a capacitor 52c formed by the plate 52 and the ring 10, the capacitors 50c, 52c being connected in parallel.

The plates 50, 52 are both connected to one side of a DC source 58, the other side of which is connected to a DC ground. Annular electrode 24 provides a pick-off from ring 10 in the same manner as described in connected with FIG. 3. The electrode 24 is connected to an AC amplifier 64 adapted to amplify AC signals with respect to DC ground. When the node locations 46, 48 are at the null position shown in FIG. 1, the capacitance of capacitors 50c, 52c remains constant. When the node locations 46, 48 are shifted in either direction from the null position the capacitance varies at the vibration frequency due to the radial vibration of the ring 10 induced by the AC input to the support electrodes, as previously described. The variation in capacitance of the capacitors 50c, 52c causes a variable impedance path, whereby an AC voltage is provided to the input of the amplifier 64.

Since radial motion of the ring 10 is in opposite directions on each side of a node, the voltage provided to the amplifier 64 has a phase indicative of the direction of apparent rotation of the nodes 46, 48. In response to an apparent clockwise rotation of the node locations 46, 48 from the null position, an AC voltage of the known phase is provided to the amplifier 64. An apparent counterclockwise rotation of the node locations 46, 48 causes an AC voltage of the opposite phase to be provided to the amplifier 64.

The output of the amplifier 64 is provided to the signal input of a synchronous demodulator 66. The source 28 is connected to the reference input of the demodulator 66 through lines 68, 70. The amplifier 64 and the demodulator 66 are respectively similar to the amplifier 34 and the demodulator 36 described hereinbefore.

The output of the demodulator 66 is provided at output terminals 72, 74. In response to an apparent clockwise rotation of the node locations 46, 48, there is provided at the terminal 72 a DC displacement voltage which is more positive than a DC displacement voltage provided at the terminal 74. In response to an apparent counterclockwise rotation, provided at the terminal 72 is a DC displacement voltage which is more negative than a DC displacement voltage provided at the terminal 74. As explained hereinafter, an apparent clockwise (or a counterclockwise) rotation of the nodes causes a counterclockwise (or clockwise) rotation of the ring, whereby the node locations 46, 48 are maintained in the null position.

The terminals 72, 74 are connected to a pair of similar analog switches 76, at respective excitation inputs thereof. In response a DC positive voltage at its excitation input, the switch 76 substantially provides a connection between a switch terminal 76a and pole terminal 76b; a negative voltage at the excitation input causes a substantial connection between a switch terminal 76c and the pole 76b. The switch 78 has terminals 78a, 78b, 78c corresponding to the terminals 76a, 76b, 76c, respectively, and operates to provide connections therebetween in the same manner described for switch 76.

The terminals 76a, 78a are connected to a three-phase voltage source 80 at a terminal 82 thereof whereby the switches 76, 78 receive an AC voltage having a phase $\phi A$. The terminals 76c, 78c are connected to a terminal 84 of the source 80 whereby the switches 76, 78 receive an AC voltage having a phase, $\phi B$, which lags the voltage provided at the terminal 82 ($\phi A$ phase) by 120° (which is conventional for voltages provided by a three-phase source). A terminal 86 of the source 80 provides an AC voltage having a phase, $\phi C$, which lags the voltage provided at the terminal 84 by 120°. The terminal 86 is connected to one end of a coil 88, the other end of the coil 88 being connected to ground, whereby the coil 88 has applied thereto the AC voltage having the phase, $\phi C$.

The terminals 76b, 78b are respectively connected to ends of coils 90, 92, the other ends thereof being connected to ground. Accordingly, in response to an apparent clockwise rotation of the node locations 46, 48, the coils 90, 92, 88 are substantially connected to the terminals 82, 84, 86, respectively, in that sequence. Therefore, an apparent clockwise rotation of the node locations 46, 48 causes the application of voltages to the coils 90, 92, 88 in the phase sequence $\phi A$, $\phi B$, $\phi C$.

In response to an apparent counterclockwise rotation of the node locations 46, 48, the coils 92, 90, 88, are substantially connected to the terminals 84, 82, 86, respectively, in that sequence. Therefore, a counterclockwise rotation of the node locations 46, 48 causes the application of voltages to the coils in the phase sequence $\phi B$, $\phi A$, $\phi C$.

Figure 5:
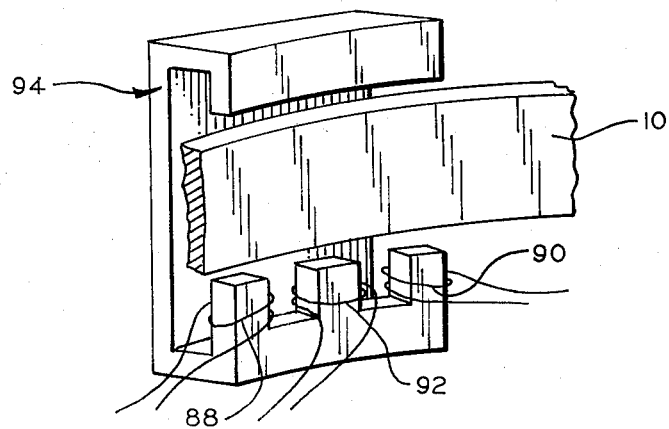
FIG. 5 is a fragmentary, diagrammatic showing of a core for providing eddy currents to rotate the ring of FIG. 1.

Referring now to FIG. 5, the coils 90, 92, 88 are wound on respective pole pieces of a fixedly mounted core 94 which encloses two opposite sides or edges of the ring 10, but is not in mechanical contact therewith. Accordingly, the ring 10 is in the magnetic flux path of the core 94. In response to the voltages in the phase sequence φA, φB, φC, the three pole pieces are sequentially excited to create a magnetic field which, in effect, is moving from right to left, as seen in FIG. 5, i.e., in a counterclockwise direction with respect to the ring 10. This will generate eddy currents in the ring 10 tending to oppose the motion of the field. The ring experiences a force urging it in the direction of field motion, i.e., counterclockwise. In like manner, excitation of the pole pieces by providing voltages in the phase sequence φB, φA, φC causes a clockwise rotation of the ring 10. Thus, an eddy current drive is provided, tending to rotate the ring 10 to the null position.

Referring again to FIG. 2, the ring 10 has on an inside surface 96 a first circumferential mirror pattern 98 which is comprised of similar, light reflective strips circumferentially spaced by arc lengths equal to the arc length of a strip. Also disposed on the surface 96 parallel to the pattern 98 but rotated therefrom by half the arc length of a strip is a second circumferential mirror pattern 100 (similar to the pattern 98).

Within the ring 10, a light source 102 comprised of a mercury capillary lamp, or other suitable light source provides a beam of light radially of the ring 10. The line of light is provided through a beam splitter 104 to the patterns 98, 100.

In response to the ring 10 being in a rotational position to cause the reflection of light from a strip of the pattern 98, light reflected therefrom passes back through the beam splitter 104 to a photodetector 106. In response to the ring 10 being in a position to cause the reflection of light from a strip of the pattern 100, light reflected therefrom passes back through the beam splitter 104 to a photodetector 108. The provision of reflected light to photodetectors, as described hereinbefore, is well known in the art, and therefore is shown in diagrammatic form in FIG. 2.

Figure 6:
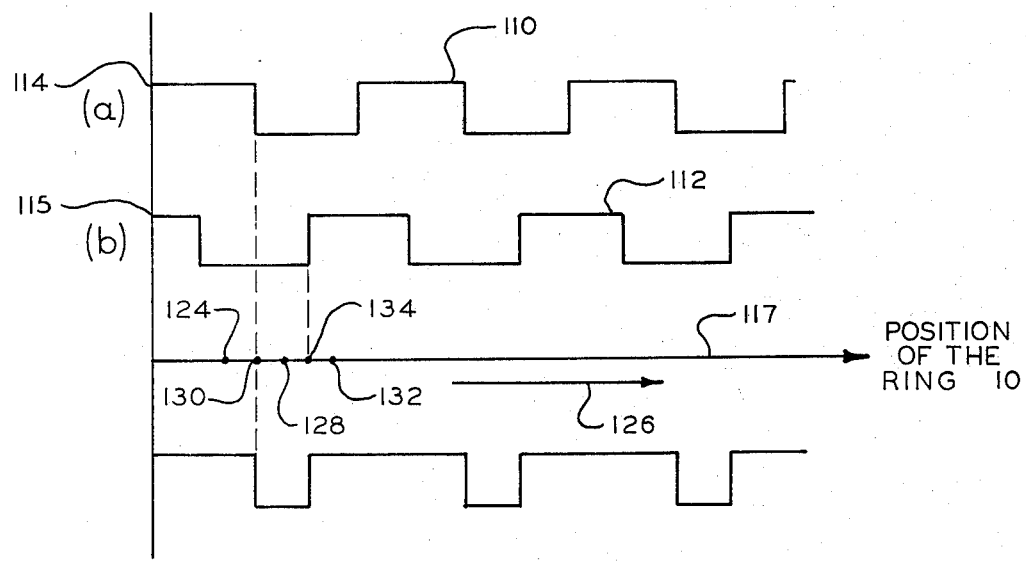
FIG. 6 is an illustration of waveforms of signals associated with the detectors of FIG. 2.

Referring now to illustrations a and b, FIG. 6, waveforms 110, 112 are respectively representative of voltages provided by the photodetectors 106, 108 as a function of the rotation of the ring 10 with respect to the light source 102.

In response to reflected light from the pattern 98 the photodetector 106 provides a logic signal of approximately 3 volts (referred to as ONE hereinafter). In the absence of light reflected from the pattern 98, the photodetector 106 provides a logic signal of approximately ground (referred to as ZERO hereinafter). In a similar manner, reflected light from the pattern 100 and the absence thereof causes the photodetector 108 to respectively provide ONE and ZERO. ONE, provided by the photodetectors 106, 108 are respectively represented by an ordinate 114 of the waveform 110 and an ordinate 115 of the waveform 112. Points on an abscissa 117 are representative of circumferentially disposed points on the ring 10.

As described hereinafter, the logic signals provided by the photodetectors 106, 108 are used to generate signals which are provided to an up-down counter. In response to the generated signals, the up-down counter provides a signal representation of the rotary position of the ring 10 with respect to the light source 102.

Figure 7:
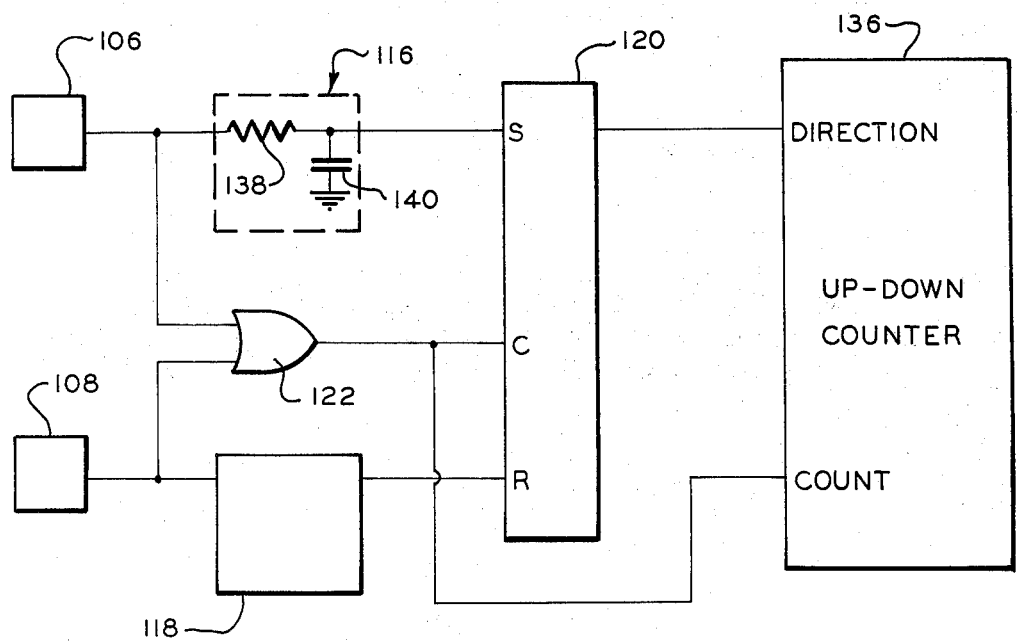
FIG. 7 is a block diagram of a circuit which provides a signal representation of the rotary position of the ring of FIG. 1.

Referring now to FIG. 7, the outputs of the detectors 106, 108 are respectively provided to the inputs of similar delay networks 116, 118. The delay networks 116, 118, which are described hereinafter, are of a well known type which provides a logic signal substantially the same as, but delayed from, a logic signal applied at the input thereof. In the preferred embodiment, the delay networks 116, 118 provide a delay which is small compared with the time for the ring 10 to rotate through the arc length of a light reflective strip.

The outputs of the delay networks 116, 118 are respectively connected to a flip flop 120 at set and reset inputs thereof. The output of the flip flop 120 is referred to as a direction logic signal hereinafter.

The direction logic signal is ONE in concurrent response to ONE and ZERO being respectively provided to the set and reset inputs and a clock transition from ONE to ZERO at a clock input of the flip flop 120. The direction logic signal is ZERO in concurrent response to ZERO and ONE being respectively provided set and reset inputs and the clock transition. The flip flop 120 is a set-rest type well known in the digital circuit art. The direction logic signal, as explained hereinafter, provides an indication of the direction of rotation of the ring 10.

The clock input is connected to the output of an OR gate 122 which has a pair of inputs respectively connected to the detectors 106, 108. As is known to those skilled in the art, the OR gate 122 provides ONE in response to ONE being provided at an input thereof. When, for example, the ring 10 is at a position represented by a point 124 (FIG. 6), ONE and ZERO are respectively provided to the set and reset inputs and ONE is provided to the clock input. In response to the ring 10 being rotated in a direction represented by the direction of an arrow 126 to a position represented by a point 128, a rotation immediately beyond the position represented by the point 130 causes the output of the detector 106 to change from ONE to ZERO, whereby ZEROs are provided to both inputs of the OR gate 122, causing a clock transition.

In response to rotation immediately beyond the point 130, ONE is provided to the set input because the delay network 116 prevents simultaneous changes at the output of the detector 106 and the output of the delay network 116. Therefore, in response to rotation in the direction represented by the direction of the arrow 126, the direction logic signal is ONE.

In response to the ring 10 being rotated in a direction opposite from the direction represented by the arrow 126 from a point 132 to the point 128, a rotation immediately beyond the location represented by the point 134 causes the output of the detector 108 to change from ONE to ZERO whereby a clock transition is provided. For reasons explained hereinbefore, set and reset inputs are respectively ZERO and ONE in response to rotation immediately beyond the point 134, wherby a direction logic signal of ZERO is provided.

The outputs of the flip flop 120 and the OR gate 122 are respectively connected to direction and count inputs of an up-down counter 136. The counter 136 provides at a plurality of output terminals a logic signal representation of a cumulative number of transitions from ZERO to ONE at the count input. In response to the direction logic signal being ONE, the counter 136 is incremented; in response to the logic direction signal being ZERO, the counter is decremented. Therefore, the output of the counter 136 is a representation of the rotational position of the ring 10.

The delay network 116 is comprised of a resistor 138, one end thereof being the input of the network 116 and the other end being connected to ground through a capacitor 140. In response to a change from ZERO to ONE (or ONE to ZERO) by the detector 106, the time for the capacitor 140 to substantially charge (or discharge) is the delay of the delay network 116.

Naturally, many modifications of the embodiment of the invention disclosed herein will be apparent to those skilled in the art. Among these are the manner of supporting the ring, the means for effecting vibration and rotation thereof, and the optical pick-off means. For example, the support electrodes could be replaced by U-shaped electromagnets and the ring supported by a magnetic rather than electrostatic field. The capacitance bridge, in such case, could be replaced by an inductance bridge, with the amplifier providing DC current to the appropriate magent winding to maintain the ring centered.

A suitable torquer other than the disclosed eddy current drive could be used to rotate the ring to the null position. The optical encoder could utilize a series of parallel lines scribed on the circumferential extent of the ring surface, rather than the mirror patterns employing reflective strips.

What is claimed is:

1. The method of providing an indication of the rotation about an axis of a gyroscopic element comprising the steps of:
   a. supporting a thin-walled ring to substantially prevent motion thereof in any direction other than rotation about the ring axis;
   b. vibrating said ring to set up nodes of vibration;
   c. establishing fixed reference positions for said nodes;
   d. rotating said ring to move said nodes to said reference positions in response to a relative rotation of said ring and said reference positions; and
   e. indicating the amount and directions of rotation required to move said nodes back to said reference positions.

2. The method according to claim 1 wherein said ring is supported by an electrostatic field.

3. The method according to claim 1 wherein said ring is supported by an electromagnetic field.

4. The method according to claim 1 wherein said ring is vibrated by applying thereto alternating electrostatic forces.

5. The method according to claim 1 wherein said ring is vibrated by applying thereto alternating electromagnetic forces.

6. The method according to claim 1 wherein said indicating is performed by optically sensing the amount and direction of rotation of said ring.

7. The method according to claim 1 wherein said ring is rotated to move said nodes to said reference positions by a moving induced magnetic field.

8. The method according to claim 7 wherein said ring is rotated by the force resulting from eddy currents in said ring opposing motion of said magnetic field.

9. A gyroscope for use in a strap-down application comprising:
   a. a thin-walled ring;
   b. first means for supporting said ring at a nominal position for movement only in rotation about its own axis;
   c. second means for maintaining said ring in a state of sustained vibration, thereby establishing nodes of vibration;
   d. third means establishing a fixed reference location for said nodes;
   e. fourth means for rotating said ring to move said nodes to said reference location in response to an apparent rotation of said ring moving said nodes away from said reference location; and
   f. optical means for measuring the direction and amount of rotation of said ring by said fourth means.

10. The invention according to claim 9 wherein said first means comprises a plurality of fixed plates symmetrically positioned with respect to said nominal position of the ring, and electrical means for providing to said plates a voltage establishing an electrostatic field of magnitude sufficient to maintain said ring at said nominal position thereof.

11. The invention according to claim 10 wherein said ring forms one side of capacitors, the other sides of which are formed by the respective plates, and said capacitors are arranged in a bridge circuit, imbalance of which is caused by movement of said ring in any direction other than rotation about its own axis.

12. The invention according to claim 9 wherein said second means comprises means providing an alternating voltage to said plates, the latter being so disposed with respect to said ring that said ring is vibrated at the frequency of said voltage.

13. The invention according to claim 9 wherein said third means comprises at least one arcuate electrode fixedly positioned adjacent one of said reference locations and forming one side of a capacitor, the other side of which is formed by said ring.

14. The invention according to claim 13 wherein said fourth means comprises an eddy current torquer.

15. The invention according to claim 14 wherein two of said arcuate electrodes are provided adjacent two of said reference locations, said ring forming one side of two capacitors, the other sides of which are formed by respective ones of said two electrodes, said two capacitors being connected in parallel to a DC voltage source.

16. The invention according to claim 9 wherein said optical means comprise alternating reflecting and non-reflecting portions symmetrically arranged on a circumferential surface of said ring, and sensing means responsive to the movement of said portions past a fixed sensing position.

17. The invention according to claim 16 wherein said sensing means comprise photodetector means arranged to receive light reflected from said ring surface.

18. The invention according to claim 17 wherein said reflective and non-reflective portions are provided in two parallel rows, axially spaced on said surface, the reflecting portions of one row being circumferentially spaced from those of the other row in predetermined relation.

19. The invention according to claim 18 wherein two photodetectors are provided, one for receiving light reflected from each of said rows and generating signals in response thereto.

20. The invention according to claim 19 wherein said sensing means further comprise logic means responsive to signals from said photodetectors and capable of discriminating the direction of rotation of said ring in accordance with the sequence of presence or absence of signals from said photodetectors.

21. The invention according to claim 20 wherein the output of said logic means is supplied to an up-down counter.

* * * * *